_United States Patent Office_ 3,487,212
Patented Dec. 30, 1969

3,487,212
INFRARED IMAGE CONVERTER
François Micheron and Clément Baumberger, Paris,
France, assignors to CSF-Compagnie Generale de
Telegraphie Sans Fil, a corporation of France
Filed May 22, 1968, Ser. No. 731,020
Claims priority, application France, May 23, 1967,
107,450
Int. Cl. G01t 1/16; H01j 31/49
U.S. Cl. 250—83.3          7 Claims

ABSTRACT OF THE DISCLOSURE

A system converting infrared radiation into luminous radiation comprising a strip of ferroelectric material subjected to the infrared radiation and maintained at a temperature near the Curie point; an alternating electric field is applied to the strip and creates therein an electroluminescence, the intensity of which varies as a function of the intensity of the infrared radiation.

---

Figure 1:
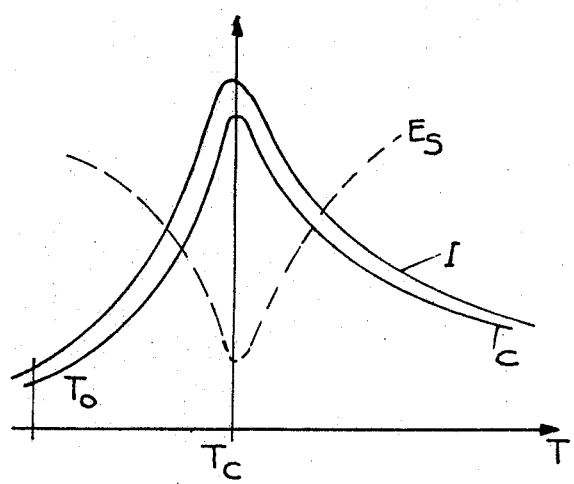

It is known that ferroelectric crystals when submitted to action of an alternating electric field emit light. For a given field frequency and amplitude, the intensity of the emitted light is a function of the temperature of the crystal.

It is an object of this invention to provide a infrared image converter based on the above property.

According to the invention, there is provided a system for converting infrared radiation into luminous radiations, comprising: a strip of ferroelectric material; means for directing said infrared radiation on said strip; means for creating in said strip an alternating electric field; and means for maintaining said strip at a temperature near the Curie temperature of said ferroelectric material.

Figure 2:
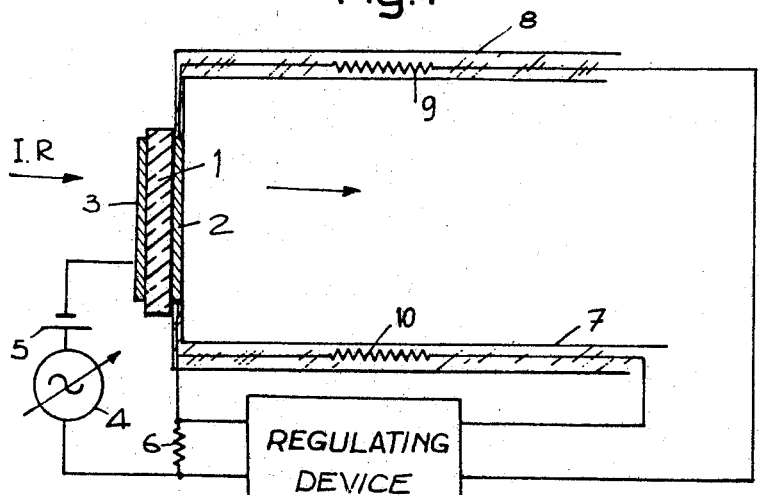
Figure 3:
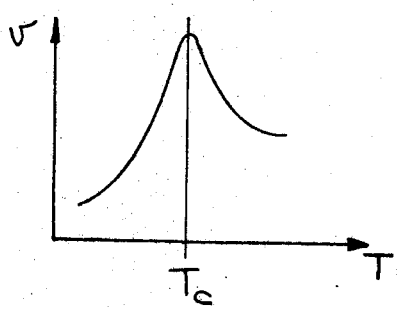
Figure 4:
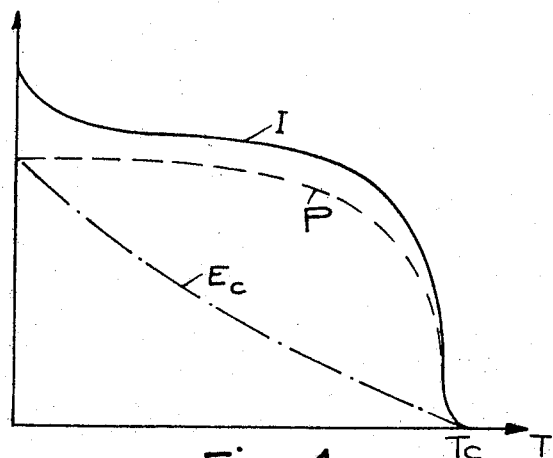
Figure 5:
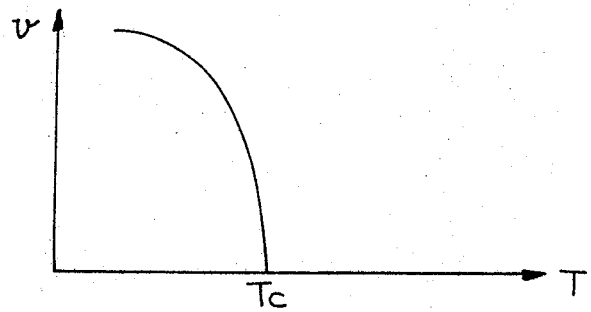
Figure 6:
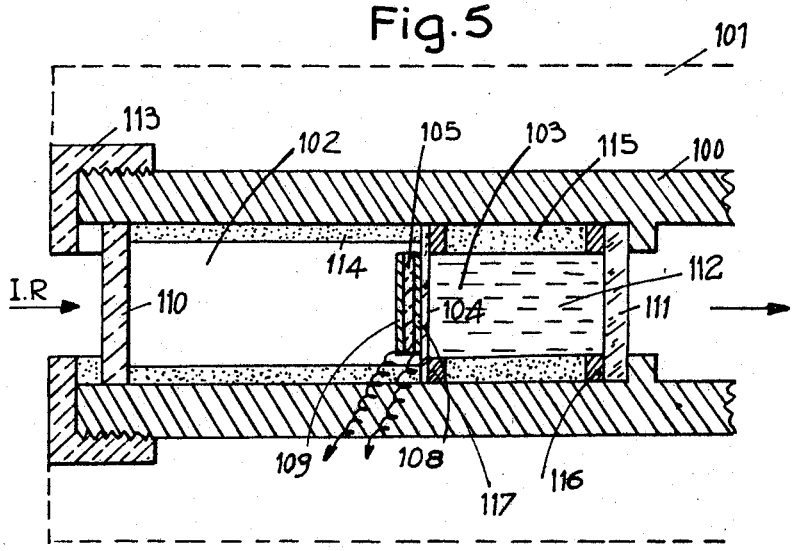

For a better understanding of the invention and to show how the same may be carried into effect, reference will be made to the drawing accompanying the following description and in which:

FIG. 1 is an explanatory diagram;
FIG. 2 shows diagrammatically an embodiment of the invention;
FIGS. 3, 4 and 5 are explanatory curves; and
FIG. 6 shows in section an embodiment of the arragement according to the invention.

In a first excitation mode, the electro-luminescence is due to the space-charge of the crystal and the polarization inversion is not concerned.

FIG. 1 shows curves indicating the variation as a function of temperature of several magnitudes.

(a) Curve I shows the variation as a function of temperature of the intensity of the light emitted by a crystal of $TiO_3Ba$ to which is applied a field of constant amplitude and constant frequency, this latter being comprised between 10 kc./s. and 100 mc./s.

The luminous intensity reaches a maximum for $T=Tc$, $Tc$ being the Curie temperature.

(b) Curve C shows the variation of the permitivity $\epsilon$ of the crystal under the same conditions.

(c) Curve $Es$ shows the amplitude $Es$ of the constant frequency alternating field at which the phenomenon concerned starts.

For a constant temperature, the luminous intensity passes through a maximum and the excitation threshold through a minimum, when the field frequency is equal to the resonance frequency of the crystal.

It may be seen from FIG. 1 that for $T<Tc$ the luminous emission increases as a function of T.

FIG. 2 shows very diagrammatically an embodiment of the invention.

A ferroelectric plate 1 is provided with a transparent electrode 2 and an electrode 3, which reflects visible light and absorbs infrared radiation. An exciter generator 4 is connected in series with a D.C. source 5 between the electrodes 2 and 3. The capacitor assembly 1–2–3 is placed in contact with an enclosure which is kept at a constant temperature and within the walls 7 and 8 of which are placed heating resistors 9 and 10. The resistors are fed through a regulating device 11. Across inputs of the device 11 is connected a resistor 6 which is in series with the generator 4 and the plate 1.

The operation of this arrangement is as follows:

Due to the action of the resistors 9 and 10, the assembly 1–2–3 is kept, in the absence of infrared radiation at a temperature $To$, which is, however, lower than $Tc$. An optical system not shown forms an infrared image over the ferroelectric strip. As a consequence the infrared light intensity varies over the surface of the strip and so does the temperature. The amplitude of the alternating voltage is so adjusted that the portions of the crystal which are not submitted to the action of infrared rays are dark, while its portions submitted to the action of these rays are luminescent. A visible image is thus formed, the electroluminescence varying as a function of the illumination. The contrast between the dark and the luminescent portions of the crystal is increased by means of the source 5. The temperature of the enclosure 7–8 may be adjusted by using the variations of capacitance C of the assembly 1–2–3, the voltage used for adjusting the current flowing through the resistors 9 and 10 being picked up across the resistor 6. This voltage is at a maximum for $T=Tc$.

When the temperature increases, the capacitance C increases, the corresponding impedance decreases and the voltage across the resistor 6 increases. As a consequence, the voltage applied by the device 11 to resistors 9 and 10 decreases, whereby the temperature in the enclosure 7–8 decreases. The D.C. voltage has for object to adjust the mean impedance of the capacitor at a convenient value.

FIG. 4 shows corresponding to another operation mode.

When the frequency of the applied alternating voltage is low, from a few cycles to a few tens of kilocycles, electroluminescence is obtained at a temperature lower than the Curie temperature $Tc$. This is due to a polarization reversal under the action of an alternating electric field. Above the temperature $Tc$, the polarization reversal no longer takes place.

FIG. 4 shows as a function of the temperature:

(a) The variation of the minimal amplitude $Ec$ of the alternating field which is necessary for the electroluminescence to take place, whatever the frequency in the above indicated limits. This amplitude is that of the coercive force of the material;

(b) The variation of the remanent polarization P;
(c) The variation of the intensity of the emitted light P.

It may be seen from FIG. 4 that:

(a) The excitation threshold is zero for $T=Tc$;
(b) The luminous intensity I is zero for $T=Tc$ and decreases when T increases with $T<Tc$;
(c) The remanent polarization P is zero for $T=Tc$.

It follows that the hot portions of the ferroelectric plate are dark, and that relatively cold portions are luminescent.

The diagram of FIG. 2 may be used provided the applied voltage is such that the field is hardly higher than $Ec$. The regulating device 11 must keep the temperature in the vicinity of the temperature $Tc$. The resistor 6 is connected as shown and the current flowing thereto is proportional to the remanent polarization.

The variation of the voltage $v$ across the resistor 6 as a function of the temperature is shown in FIG. 5.

FIG. 6 shows an embodiment of the invention.

A metal tube 100 is placed within an enclosure 101 wherein the temperature is substantially constant. The tube comprises two sections 102 and 103, separated by a wall 104 transparent to light. It may be of glass or mica. On this wall 104 is glued a plate 105 of ferroelectric material. Between the walls 104 and the plate 105, an electrode 108, also transparent to light, is interposed. It may be build up by a metal layer.

The free face of the place 105 carries an electrode 109 which is transparent to infrared and reflects visible light.

The alternating voltage is applied to electrodes 108 and 109.

The tube section 102 is closed by means of a window or an optical system 110, as the case may be, which is transparent to infrared. The window 110 is for example of germanium. The tube section 103 is closed by a plate 111 which is transparent to light. This section is filled with a liquid 112, which is kept at a constant temperature, for example as shown in FIG. 2.

A threaded cover 113 is provided at one end; spacing tubes 114 and 115 and tight joints 116 and 117 are also provided and positioned as shown.

Of course the invention is not limited to the embodiments described and shown which were given solely by way of example.

What is claimed is:

1. A system for converting infrared radiation into luminous radiation, comprising: a strip of a ferroelectric material; means for directing said infrared radiation on said strip; means for creating in said strip an alternating electric field; and means in contact with said strip for maintaining said strip at a temperature near the Curie temperature of said ferroelectric material.

2. A system as claimed in claim 1, wherein said electric field creating means comprise a generator for generating an alternating voltage having a given frequency, a first electrode transparent to infrared radiation and opaque to luminous radiation deposited on said strip, a second electrode transparent to luminous radiations deposited over said strip, thus forming with said strip a capacitor, and means for connecting in series said first and second armature and said generator.

3. A system as claimed in claim 2, wherein said temperature maintaining means comprise a thermostatic system, in contact with said second electrode, resistor means for heating said enclosure, and means responsive to the variation of the voltage across said electrodes for controlling the current flowing across said resistor, and for maintaining said temperature lower than said Curie temperature.

4. A system as claimed in claim 3, wherein said given frequency is comprised between 10 kc./s. and 100 mc./s.

5. A system as claimed in claim 3, wherein said given frequency is comprised between 1 c./s. and 500 c./s.

6. A system as claimed in claim 3, wherein said thermostatic system is a thermostatic enclosure containing a transparent liquid and having a window transparent to luminous radiation closing one end of said enclosure, a second window transparent to infrared rays closing said enclosure at its other end, said second window, and said strip forming in said enclosure a second enclosure.

7. A system as claimed in claim 6, comprising a tube wherein said thermostatic enclosure is located, and optical means in said tube for forming an infrared image on said strip.

References Cited

UNITED STATES PATENTS

| | | | |
|---|---|---|---|
| 2,985,759 | 5/1961 | Goldsmith | 250—83.3 |
| 3,293,441 | 12/1966 | Kazan et al. | 250—213 |
| 3,300,645 | 1/1967 | Winslow | 250—213 |
| 3,313,937 | 4/1967 | Hadni | 250—83.3 X |
| 3,365,576 | 1/1968 | Teeg | 250—83.3 |
| 3,374,392 | 3/1968 | Hadni | 250—83.3 X |

RALPH G. NILSON, Primary Examiner

DAVIS L. WILLIS, Assistant Examiner

U.S. Cl. X.R.

250—83